S. B. FULLER.
JIG-SAW ATTACHMENT.

No. 175,831. Patented April 11, 1876.

Witnesses.
S. N. Piper
L. N. Müller

Sylvester B. Fuller.
by his attorney
R. H. Eddy

UNITED STATES PATENT OFFICE.

SYLVESTER B. FULLER, OF LYNN, MASSACHUSETTS.

IMPROVEMENT IN JIG-SAW ATTACHMENTS.

Specification forming part of Letters Patent No. 175,831, dated April 11, 1876; application filed January 21, 1876.

*To all whom it may concern:*

Be it known that I, SYLVESTER B. FULLER, of Lynn, of the county of Essex and State of Massachusetts, have invented a new and useful Improvement in Jig-Saw Attachments; and do hereby declare the same to be fully described in the following specification, and represented in the accompanying drawings, of which—

Figure 1:
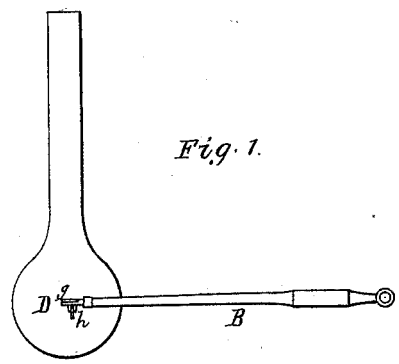
Figure 2:
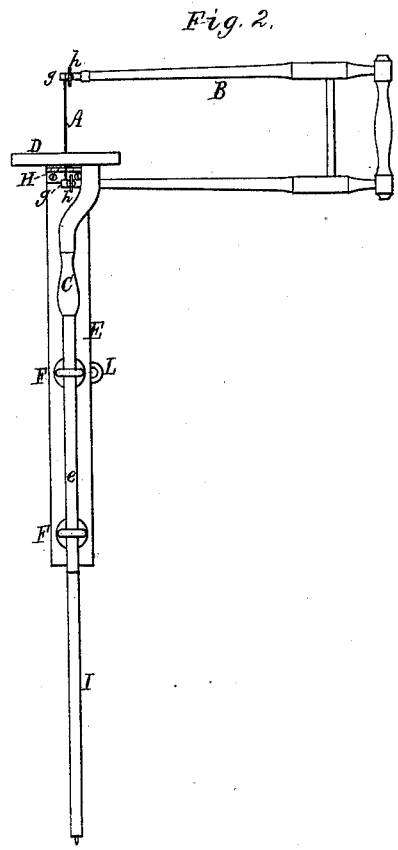
Figure 3:
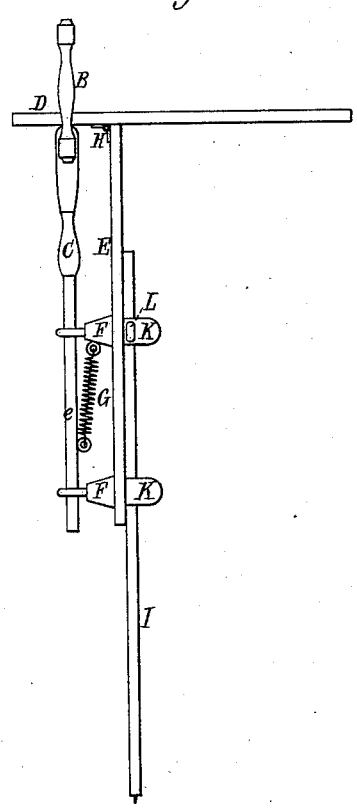

Figure 1 is a top view, Fig. 2 a front elevation, and Fig. 3 a side elevation, of a machine provided with my invention, which has reference to the machine in which the United States Patent No. 165,162, bearing date of July 6, 1875, was granted to me.

I have made sundry additions to such machine, whereby it is rendered better or more efficient in several respects—that is to say, I have combined with it an extension-leg and a clamp-screw, and I have connected the two parts of the support-frame by a hinge, such being as and for the purposes as hereinafter explained.

In the drawings, A denotes a common short jig-saw fixed at its ends in or to the prongs of a furcated frame, B, formed as shown, and attached at its lower prong to a handle, C, provided with an extension or shank, $e$, as shown. The saw passes through a hole in a board or plate, D, arranged at right angles to another plate, E, and fixed to it at its upper end. The two plates or parts, D and E, instead of being rigidly conjoined, I now connect by means of a hinge, H, arranged as shown, one leaf being secured to one plate and the other to the other, such being in order that the plate E with the saw may be adjusted at acute as well as at right angles with the plate D. From the plate E two ears or guides, F F, are projected as represented, the saw-frame handle-shank $e$ being cylindrical, and arranged to slide in corresponding bearings of said ears, to admit of the saw-carrier being turned around horizontally more or less, and moved up and down, as occasion may require. A helical or other proper spring, G, applied to the shank $e$ and one of the ears, serves to raise the handle and saw upward after each depression thereof. Furthermore, there is applied to the plate or bar E an extension leg or bar, I, to slide freely through ears K K projecting from the said bar E, one of such ears being provided with a clamp-screw, L, to screw into it against the extension-leg. At each extremity of each of the prongs of the saw-frame B are jaws $g$ $g$, provided with a clamp-screw, $h$, to close them upon the screw A, such jaws being to hold the saw to the prong.

In using the machine the part D of the frame is to be placed on a table, bench, or window-seat, or other proper support, and clamped or fastened thereto, so as to so project beyond such as to have the part E in front of it, the extension-leg being slid down until it may rest on the floor, after which the screw L should be turned up, so as to clamp the leg in position. After having properly placed on the plate D the article or piece of wood to be sawed, the operator is to grasp the handle C with his right hand, having his left hand upon or hold of the said article or piece of wood. This having been done, he is to successively pull down the handle and allow the spring to raise it after each downward movement of it, thus imparting to the saw and its carrier reciprocating up-and-down movements, he also turning the handle more or less, as may be desirable.

This little machine can be used to great advantage in sawing scroll or fret work, and also in making marquetry or inlaid work. It can be afforded to a mechanic or amateur at a trifling sum in comparison to what a jig-saw machine to operate by power usually costs. The rise of the handle is arrested by its top coming into contact with the plate D.

By my machine the sawing of wood for the inlaying of wood of one color into that of another color can be accomplished very satisfactorily, the work produced being perfect. Where one sheet of wood is to have a space cut in it to receive another piece, ornamental in form, the first plate, with another of suitable size placed on top of it, and properly secured to it, is to be laid on the board D, after which the extension-leg should be moved laterally a little, so as to cause the part E to stand at a slightly-acute angle to the board D, such as will cause the piece to be inserted in the lower piece of wood, and the hole therein to receive it, to bevel a little on their edges, and fit closely when together. The two pieces of wood are next to be sawed according to the design, the saw passing through both at once, the part removed from the upper piece will fit into the hole made in the lower piece after removal of the part sawed therefrom.

I claim as my invention in the said sawing-machine—

1. The combination of two plates, D E, and the connecting-hinge H with the saw-carrier B, its handle C, and the guides F F thereof, all being arranged substantially as described.

2. The combination of the extension-leg I and its clamp-screw L, the frame D E, the saw-carrier B, and the handle C, all being arranged and applied substantially in the manner and to operate as explained and represented.

SYLVESTER B. FULLER.

Witnesses:
R. H. EDDY,
J. R. SNOW.